(12) United States Patent
Foster et al.

(10) Patent No.: US 6,676,083 B1
(45) Date of Patent: Jan. 13, 2004

(54) METHOD OF RELEASING STORES FROM AN EJECTION RACK

(75) Inventors: John K. Foster, St. Peters, MO (US); Thaddeus M. Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/310,250

(22) Filed: Dec. 4, 2002

(51) Int. Cl.[7] .................................................. B64D 1/12
(52) U.S. Cl. ........................ 244/137.4; 89/1.54; 60/410
(58) Field of Search ......................... 244/137.4; 89/1.53, 89/1.54; 60/409, 410

(56) References Cited

U.S. PATENT DOCUMENTS

| | | | | |
|---|---|---|---|---|
| 3,738,609 A | * | 6/1973 | Divigard ..................... | 137/79 |
| 4,031,950 A | * | 6/1977 | Shultz ........................ | 165/259 |
| 4,095,762 A | | 6/1978 | Holt | |
| 4,204,456 A | | 5/1980 | Ward | |
| 4,336,590 A | * | 6/1982 | Jacq et al. ............. | 128/204.21 |
| 4,355,280 A | * | 10/1982 | Duzich .................. | 324/207.12 |
| 4,905,568 A | | 3/1990 | Hetzer et al. | |
| 5,583,312 A | | 12/1996 | Jakubowski, Jr. | |
| 5,605,043 A | * | 2/1997 | Dimmock ................... | 60/407 |
| 5,907,118 A | | 5/1999 | Jakubowski, Jr. et al. | |
| 6,035,759 A | | 3/2000 | Jakubowski, Jr. et al. | |
| 6,119,982 A | * | 9/2000 | Jakubowski et al. ..... | 244/137.4 |
| 6,302,249 B1 | * | 10/2001 | Jolly et al. .................. | 188/269 |
| 6,347,768 B1 | | 2/2002 | Jakubowski, Jr. et al. | |

* cited by examiner

*Primary Examiner*—Michael J. Carone
*Assistant Examiner*—Daniel Matz
(74) *Attorney, Agent, or Firm*—Thompson Coburn LLP

(57) ABSTRACT

A method of ejecting or jettisoning stores from an aircraft is disclosed that pertains essentially a method of supplying the gas storage system with compressed gas that has a pressure-to-temperature ratio that ensures proper jettisoning of stores under all design temperature specifications, without the need for on-board compressors, heating elements, or venting systems. The invention can be practiced by simply making a temperature measurement, during or before the step of supplying the gas storage system with compressed gas, and determining therefrom the necessary pressure of compressed gas to initially supply to the gas storage system. By so doing, the performance of the ejection system at various temperatures is automatically controlled, regardless of the temperature of the compressed gas immediately after such gas is supplied to the gas storage system.

21 Claims, 1 Drawing Sheet

METHOD OF RELEASING STORES FROM AN EJECTION RACK

BACKGROUND OF THE INVENTION

Aircraft, particularly military aircraft, often utilize racks located beneath their wings and/or fuselages to carry stores and to release such stores from the aircraft upon command. The stores typically are munitions such as bombs, missiles, and rockets, but also include other items such as fuel tanks.

Typical store racks are shown in U.S. Pat. Nos. 4,043,525 and 4,347,777, which are incorporated herein by reference, in their entireties. As is well known, store racks typically include a release mechanism for selectively releasing a store from the aircraft upon command and often include one or more ejector rams for forcibly ejecting stores from the aircraft during their release. It is also known that various means can be used for actuating the release mechanisms and/or the ejector rams. Such means may include compressed springs, pyrotechnic cartridges, hydraulic systems, and pneumatic systems. Additionally, the release mechanisms and the ejector rams of any given store rack may be actuated via the same source of power or via separate unrelated sources of power.

The present invention pertains particularly to pneumatically actuated store racks, which have increasingly been utilized for supplying the power to the ejector rams to forcibly eject stores. Pneumatically actuated systems have several advantages including low weight, high reliability, low maintenance requirements, and operational safety.

Typically, compressed gas is supplied to a pneumatically actuated ejection system via a compressed gas storage system that, during flight and prior to the release of a store, maintains the compressed gas at a pressure sufficient to properly operate the ejection system. Because of this, several issues are of concern when utilizing pneumatically actuated ejection systems. In particular, throughout the flight of an aircraft, the gas storage system may vary in temperature by as much as over 200 degrees Fahrenheit. Such temperature variances can cause substantial changes in the pressure of the compressed gas stored in the gas storage system. This is a problem because, in many cases, the pneumatically actuated ejection systems are configured to be operated using compressed gas within fairly narrow and specific pressure ranges. As such, numerous methods have been developed and utilized to ensure that the gas stored in the gas storage system is maintained within the proper operating pressure range of the ejection system. One such method is to utilize an on-board heat source for heating the compressed gas within the gas storage system so as to increase the pressure of the compressed gas as needed. Another method is to provide an on-board gas compressor for adding additional compressed gas to the gas storage system to thereby increase the pressure of the stored gas as needed. It is also known to utilize vent valves to decrease the pressure of the stored gas as needed.

Despite the various developments and improvements associated with pneumatically actuated store rack ejection systems, there nonetheless remains room for further improvement.

SUMMARY OF THE INVENTION

The present invention eliminates many of the concerns associated with prior art ejection systems by providing a method of supplying the gas storage system with compressed gas that has a pressure-to-temperature ratio that ensures proper jettisoning of stores under all design temperature specifications, without the need for on-board compressors, heating elements, or venting systems. The invention can be practiced by simply making a temperature measurement, during or before a step of supplying the gas storage system with compressed gas, and determining therefrom the necessary pressure of compressed gas to initially supply to the gas storage system. By so doing, the performance of the ejection system at various temperatures is automatically controlled, regardless of the temperature of the compressed gas immediately after such gas is supplied to the gas storage system.

In general, a first method of practicing the invention comprises the step of providing an aircraft having at least one pneumatically actuated store rack and a gas storage system. The first method also comprises attaching a store to the store rack, predicting a minimum operational temperature of compressed gas within the gas storage system that is likely to occur during flight of the aircraft, and predicting a maximum operational temperature of compressed gas within the gas storage system that is likely to occur during flight of the aircraft. Yet further, the first method comprises the step of calculating a pressure-to-temperature ratio that ensures that an amount of compressed gas stored within the gas storage system will maintain a pressure sufficient to actuate the store rack in a manner to safely and effectively jettison the store from the aircraft, regardless of whether such an amount of compressed gas is at the minimum operational temperature or the maximum operational temperature. Finally, the first method yet further comprises the steps of supplying compressed gas to the gas storage system in a manner such that the gas storage system contains an amount of compressed gas at approximately the calculated pressure-to-temperature ratio, and using the amount of compressed gas to actuate the store rack and thereby jettison the store from the aircraft.

A second method of practicing the invention comprises providing a similar aircraft and attaching a store to the store rack. This method further includes determining an initial pressure for supplying the gas storage system with compressed gas. In this method, the determination of the initial pressure is dependent upon a temperature measurement. Finally, this method further comprises the steps of supplying compressed gas to the gas storage system in a manner such that an amount of compressed gas within the gas storage system has a pressure approximately equal to the determined initial pressure, and using the portion of the amount of compressed gas to actuate the store rack and thereby jettison the store from the aircraft.

A third method of practicing the invention, once again, comprises providing a similar aircraft and attaching a store to the store rack. This method further includes calculating a pressure-to-temperature ratio and supplying compressed gas to the gas storage system in a manner such that an amount of compressed gas within the gas storage system has a pressure-to-temperature ratio approximately equal to the calculated pressure-to-temperature ratio. In this method, the calculated pressure-to-temperature ratio is such that the amount of compressed gas would have a pressure capable of actuating the store rack in a manner to impart at least a first total amount of work to the store when the store is released from the aircraft and when the amount of compressed gas is at a temperature of minus forty degrees Fahrenheit. Similarly, the calculated pressure-to-temperature ratio is also such that the amount of compressed gas would have a pressure low enough to actuate the store rack in a manner to impart at most a second total amount of work to the store when the store is released from the aircraft and when the amount of compressed gas is at a temperature of one hundred and sixty-five degrees Fahrenheit. The second total amount of work is at most 1.5 times greater than the first total amount of work. With the temperature of the compressed gas varying between one hundred and sixty-five degrees and minus forty degrees, the ejection system will impart a range of amounts of work to a store during its release. However, by virtue of the calculated pressure-to-temperature ratio, the ejection velocity will vary by only plus or minus ten percent. Finally, the method yet further comprises using the amount of compressed gas to actuate the store rack and thereby jettison the store from the aircraft.

While the principal advantages and features of the invention have been described above, a more complete and thorough understanding of the invention may be obtained by referring to the drawing and the detailed description of the preferred embodiment which follow.

Figure 1:
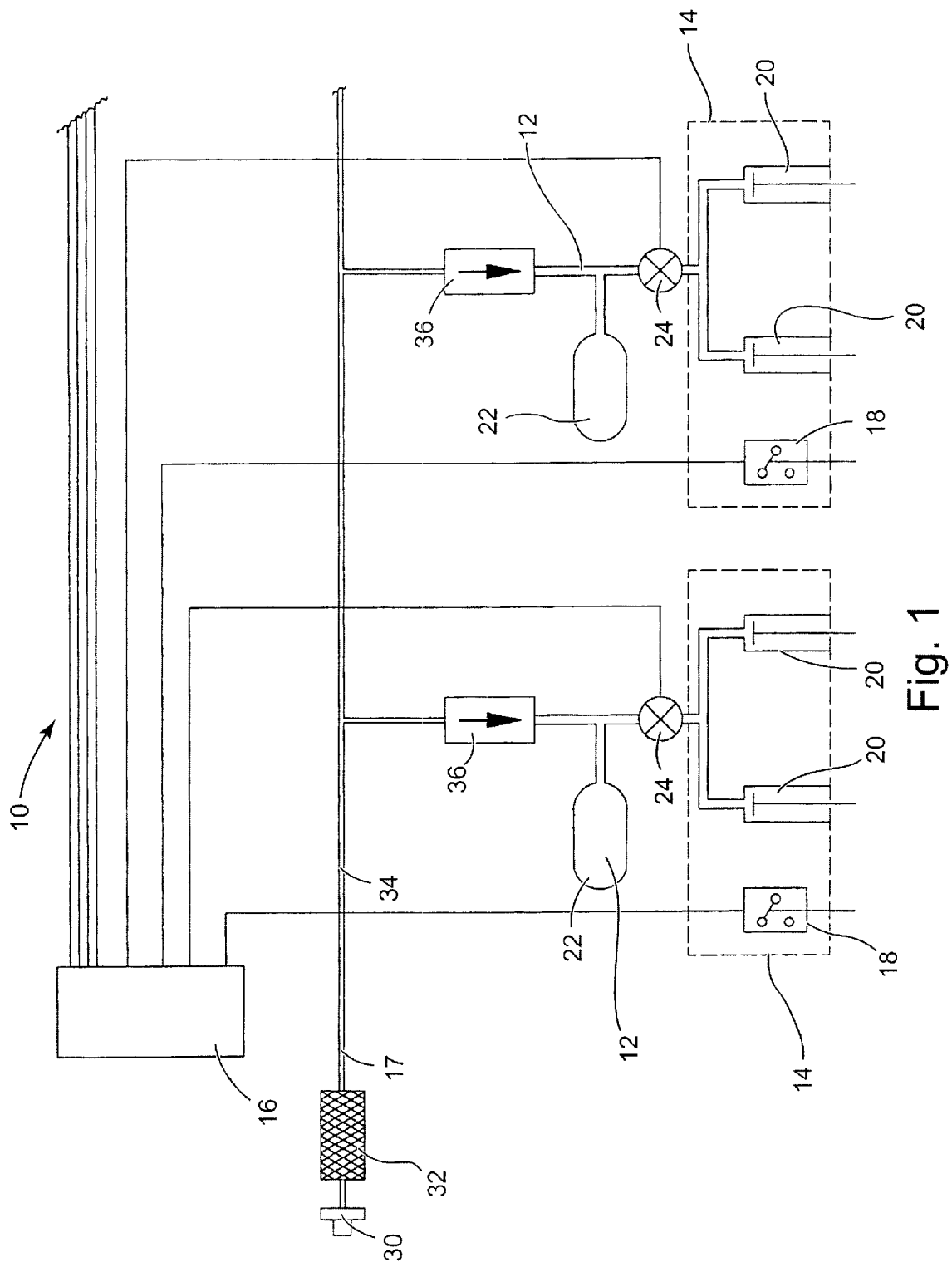
FIG. 1 is a schematic view of the ejection system utilized in connection with the preferred embodiment of the method of practicing the invention.

Reference characters in the written specification indicate corresponding items shown in the drawing figure.

DETAILED DESCRIPTION OF THE PREFERRED EMBODIMENT OF THE INVENTION

A schematic of the pneumatically actuated ejection system 10 utilized in the practicing of the preferred embodiment of the invention is shown in FIG. 1. It should be appreciated that the invention can be used in connection with virtually any type of pneumatically actuated ejection system, and therefore the structural details of the particular type of release mechanisms and/or ejection rams are not disclosed herein. Moreover, the pneumatically actuated ejection system 10 utilized with the invention comprises conventional components well known in the relevant industry and it should be appreciated that it is only the procedure of using such components that is of particular relevance to the invention.

The pneumatically actuated ejection system 10 of the preferred embodiment comprises one or more gas storage systems 12, one or more store racks 14, a stores management system 16, and a gas fill system 17. Each of the store racks 14 is configured to releasably attach a store to an aircraft. The gas storage system 12 is configured and adapted to supply the power necessary to actuate the store rack 14 to thereby release a store from the aircraft when desired. The stores management system 16 is housed within the aircraft and is operatively connected to the gas storage systems 12 and the store racks 14 to thereby control their operation. Finally, the gas fill system is configured to supply compressed gas to the gas storage system 12.

For purposes of explaining the invention in greater detail without discussing cumulative information, only one gas storage system and one store rack are hereinafter discussed. Nonetheless, it should be appreciated that more than one store rack could be operated in connection with one or more gas storage systems and that any one gas storage system could be a sub-portion of a larger gas storage system.

The store rack 14 is preferably a conventional store rack of the type that comprise a mechanical release mechanism 18 and one or more pneumatically driven ejector rams 20.

The release mechanism 18 is configured and adapted to selectively and releasably secure a store to the aircraft. The ejector rams 20 are adapted to utilize compressed gas to force stores away from the aircraft when such stores are released.

The gas storage system 12 preferably comprises an accumulator 22 and a dump valve 24. The accumulator 22 is configured to store and contain compressed gas therewithin. The dump valve 24 is operatively connected to the accumulator 22 and is configured to selectively permit the compressed gas within the accumulator to communicate with, and thereby actuate, the ejector rams 20. The dump valve 24 is also configured to selectively prevent such communication and actuation.

The stores management system 16 is preferably a conventional electronic management system and is operatively connected to the various other components of the ejection system 10 preferably as shown in FIG. 1. However, it should be appreciated that the stores management system 16 could be in communication with more or less of the components and could even be absent depending on the configuration of the particular ejection system.

The gas fill system preferably comprises a gas fill port 30, a filter 32, a gas passageway 34, and one or more one-way check valves 36, all of which are preferably housed within the aircraft. The gas fill port 30 is configured and adapted to allow a source of compressed gas to be attached thereto in a manner such that the source of compressed gas can supply compressed-gas to the gas passageway 34. The filter 32 is configured and adapted to prevent abrasive and/or corrosive particles from entering the gas passageway 34. The gas passageway 34 is connected to the gas storage system 12 via the check valve 36. The check valve 36 is in communication with the gas passageway 34 and the respective accumulator 22 in a manner allowing compressed gas within the gas passageway to pass into the accumulator. However, the purpose of the check valve is to prevent compressed gas within the accumulator 22 from passing back into the gas passageway.

Having described the various components of the ejection system 10, the preferred embodiment of the method of practicing the invention will now be described. Again, to avoid needless cumulative information, the operation of only one store rack and one gas storage system is described. Nonetheless, it should be appreciated that the method could be utilized with any number of store racks using any number of gas storage systems.

In use, a store is attached to the aircraft via one of the store racks 14 prior to the aircraft's flight. The pneumatically actuated ejection system 10 is also "charged" prior to the flight of the aircraft. The charging of the ejection system 10 is preferably performed by connecting a source of compressed gas to the gas fill port 30 of the gas fill system 17. The source of compressed gas is preferably a portable land-based compressor cart, but tanks of compressed gas could also be used and the source could be on board the aircraft. Moreover, the compressed gas is preferably air, but other compressible gases could be utilized.

During the charging process, the compressed gas from the source of compressed gas passes through the filter 32 and into the gas passageway 34. From the gas passageway 34, the compressed gas supplied via the source passes through the check valves 36 and into the accumulators 22, which presumably contain gas at a lower pressure. Throughout this procedure, the dump valve 24 is in closed positions to prevent compressed gas from escaping from the accumulator 22.

At some time during or prior to the charging process, a temperature measurement is made to determine the approximate temperature of the compressed gas being supplied to the gas storage system 12. Preferably, this is done by measuring the ambient air temperature surrounding the aircraft or surrounding the source of compressed gas. In most cases, the temperature of compressed gas within the gas storage system 12 will be approximately equal to this measured temperature immediately after the step of supplying the compressed gas is terminated. However, it should be appreciated that alternative or additional temperature measurements, such as a measurement of the temperature of the gas storage system or of the compressed gas within the gas storage system itself, could also be utilized and may provide more or less accurate estimations.

A person or device charging the gas storage system then identifies a pressure value that corresponds to the particular temperature measurement. Preferably this done by using a chart that has a list of temperatures and a list of corresponding pressure values for at least the specific type or model of store rack at issue. The supplying of compressed gas preferably continues until the compressed gas within the accumulator 22 reaches a gauge pressure approximately equal to the pressure value that corresponds to the particular temperature measurement. After the compressed gas within the accumulator 22 is charged to this pressure, the source of compressed gas is detached from the gas fill port 30 of the gas fill system 17 and remains detached from the aircraft throughout the aircraft's flight. The check valve 36 of the gas fill system 17 then operate to prevent the compressed gas within the accumulator 22 from flowing back into the gas fill system 17.

The correlation between the temperature values and the corresponding pressure values mentioned above is an important aspect of the preferred method of practicing the invention. To appreciate this correlation, it is useful to first appreciate certain design criteria and concerns regarding store racks and their operation.

Based on well known principles and laws of thermodynamics, it is known that, assuming the total amount of compressed gas and it's volume remain constant and assuming ideal gas conditions, the absolute pressure of such gas will be directly proportional to its absolute temperature. Thus, as the temperature of the gas increases or decreases, the pressure of the gas increases or decreases respectively. However, the absolute pressure to absolute temperature ratio generally remains constant. It is also known that both the pressure and the temperature of compressed gas used to actuate a store rack affect the performance of the jettisoning or ejection of a store from the store rack. This is because the pressure of the compressed gas drives the ejector rams 20 and the temperature of the compressed gas affects the viscosity of the compressed gas, and thereby the pressure loss as the compressed gas flows into the ejector rams.

Using the well known principles of thermodynamics and of gas dynamics, it should be appreciated that, for any given store rack, the total amount of work or energy that can be delivered to or imparted upon a particular store during its release from the store rack can be calculated based on the pressure and temperature of the compressed gas utilized to actuate the store rack and the design characteristics of the gas flow path. Because the details of such calculations are well known in the industry, they are not needlessly discussed herein.

A typical design criteria of a store rack ejection system is that it be able to eject a particular "worst-case" store away from the aircraft with at least a specified velocity, referred to as the "end-of-stroke" velocity, regardless of the temperature of the aircraft. Although this could be done by designing the ejection system to impart an excessive amount of work to the store, such an excessive amount of work would create large reaction forces that must be borne by the aircraft's structure. As a result, it is desirous to design an ejection system to deliver only a narrow range of energy or work that is just slightly greater than is required to achieve the desired end-of-stroke velocity.

In the case of the preferred method of the invention, it is desired that the store rack and the ejection system be capable of ejecting a so called "worst-case" store away from an aircraft at a velocity that falls within plus or minus ten percent of a specific velocity, throughout a temperature range from minus forty degrees Fahrenheit to one hundred and sixty-five degrees Fahrenheit. Thus, the largest velocity should be no more than 110%/90% or 1.222 times the smallest velocity. Based on well known laws of kinematics, the amount of work required to generate such a velocity is proportional to the velocity squared. Therefore, preferably, the largest amount of work imparted on a store from the ejection system should be no more than $(1.222)^2$ or approximately 1.5 times the smallest amount of work imparted on such a store.

In light of the foregoing, it should be appreciated that a calculation of the minimum pressure of compressed gas needed to actuate a particular store rack can be made. This calculation is made assuming that the compressed gas is at its coldest condition and that the store is released with only the smallest acceptable end-of-stroke velocity. Likewise, a calculation of the maximum pressure of compressed gas allowable to actuate the particular store rack can be made. This calculation is made assuming that the compressed gas is at its hottest condition and that the store is released with the largest allowable end-of-stroke velocity. The inventors of the present invention have appreciated that the difference between these minimum and maximum pressures is larger than the difference in the pressure of a constant volume of compressed gas as its temperature changes from minus forty degrees Fahrenheit to one hundred and sixty-five degrees Fahrenheit. This being said, it follows that a specific pressure-to-temperature ratio of compressed gas can be determined that, throughout the design temperature range, will ensure that at least the minimum acceptable pressure and at most the maximum allowed pressure is maintained. It should be appreciated that such a specific pressure-to-temperature ratio can be calculated numerous ways using the above-mentioned principles. However, as an example, a specific pressure-to-temperature ratio can be determined by averaging the minimum and maximum pressures discussed above and dividing the result by the median absolute temperature within the temperature range. It should also be appreciated that a narrow range of pressure-to-temperature ratios will satisfy these parameters.

Turning back to the description of the charging of the gas storage system of the aircraft, it should now be appreciated that the pressure value that corresponds to the particular temperature measurement identified by the person or device charging the gas storage system is a pressure value that results in the calculated pressure-to-temperature ratio discussed above.

With the pneumatically actuated ejection system 10 charged and the source of compressed gas disconnected from the aircraft, the ejection system is ready for flight and for release of the stores attached thereto. As discussed above, during such flight, the aircraft and the ejection system 10 may experience variations in temperature ranging from minus 40° F. to positive 165° F. However, by making the temperature measurement and initially supplying the accumulators 22 with compressed gas at the pressure-to-temperature ratio approximately equal to the calculated pressure-to-temperature ratio, the compressed gas within the accumulators will maintain a pressure between the minimum acceptable pressure and the maximum allowed pressure, regardless of such temperature variations.

When desired during the flight of the aircraft, a store attached to one of the store racks 14 can be jettisoned from the aircraft via the pneumatically actuated ejection system 10. To do so, a control signal indicative of an intent to release the store is sent to the stores management system 16. In response to the control signal, the stores management system 16 communicates with the release mechanism 18 of the store rack 14 to thereby unsecure the store from the store rack. Simultaneously or shortly thereafter, the stores management system 16 sends a signal to open the dump valve 24. With the dump valve 24 open, the compressed gas within the accumulator 22 is able to flow into the ejector rams 20 of the store rack 14 causing them to forcibly eject the store from the aircraft. As this is done, regardless of the temperature of the compressed gas within the storage system and regardless of the particular store, the pressure-to-temperature ratio of the compressed gas will ensure that the store is released with at least the required end-of-stroke velocity and without exerting excessive forces on the aircraft's structure.

From the foregoing, it should be appreciated that the present invention allows for the implementation of an ejection system that is capable of delivering the required end-of-stroke jettison velocity without exerting excessive forces on the aircraft's structure and without the need for onboard compressors and/or heating elements. In turn, this allows for a reduction in weight, parts, and/or costs associated with the ejection system. As such, the invention provides significant benefits and advantages over prior art methods of ejecting stores.

While the present invention has been described in reference to a specific embodiment, in light of the foregoing, it should be understood that all matter contained in the above description or shown in the accompanying drawing is intended to be interpreted as illustrative and not in a limiting sense and that various modifications and variations of the invention may be constructed without departing from the scope of the invention defined by the following claims. For example, it should be appreciated that, although the preferred embodiment is described as having separate accumulators for each store rack, a centralized accumulator could also be utilized in connection therewith or in place thereof. Additionally, it should be appreciated that the stores management system need not communicate directly with each of the components discussed in the preferred embodiment and that timers and/or direct communications between the various components could be used in the alternative. Furthermore, the system could be modified to accommodate various other ejection pressures and temperature variations. Yet further, while the preferred embodiment of the method utilizes a chart to determine the appropriate pressure to initially supply the gas storage system with compressed gas for any given measured temperature, a computer or other electronic device could also be utilized. Likewise, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Yet further, pressure and temperature ratios recited in the claims assume, and should be understood that such ratios assume absolute values of pressure and temperature or approximations thereof.

What is claimed is:

1. A method comprising:
   providing an aircraft having at least one pneumatically actuated store rack and a gas storage system, the gas storage system being configured to contain compressed gas;
   attaching a store to the store rack;
   predicting a minimum operational temperature of compressed gas within the gas storage system that is likely to occur during flight of the aircraft;
   predicting a maximum operational temperature of compressed gas within the gas storage system that is likely to occur during flight of the aircraft;
   calculating a pressure-to-temperature ratio, the ratio being such that an amount of compressed gas stored within the gas storage system at the ratio would maintain a pressure sufficient to actuate the store rack in a manner to safely and effectively jettison the store from the aircraft regardless of whether such an amount of compressed gas is at the minimum operational temperature and regardless of whether such an amount of compressed gas is at the maximum operational temperature;
   supplying compressed gas to the gas storage system via a source of compressed gas in a manner such that the gas storage system contains an amount of compressed gas at approximately the calculated pressure-to-temperature ratio;
   using the amount of compressed gas to actuate the store rack and thereby jettison the store from the aircraft.

2. A method in accordance with claim 1, the method further comprising the step of making a temperature measurement, the step of supplying compressed gas to the gas storage system further comprising determining an initial pressure for supplying the gas storage system with compressed gas, the determination being dependent upon the temperature measurement.

3. A method in accordance with claim 2, wherein the step of making the temperature measurement further comprises making a temperature measurement of ambient air surrounding the aircraft.

4. A method in accordance with claim 2, wherein the step of supplying compressed gas to the gas storage system further comprises determining the initial pressure using a chart of temperature values and correlating pressure values.

5. A method in accordance with claim 1, wherein the step of calculating the pressure-to-temperature ratio further comprises calculating the pressure-to-temperature ratio such that the amount of compressed gas would have a pressure capable of actuating the store rack in a manner to impart at least a first total amount of work to the store when the store is released from the aircraft and when the amount of compressed gas is at the minimum operational temperature, and such that the amount of compressed gas would have a pressure low enough to actuate the store rack in a manner to impart at most a second total amount of work to the store when the store is released from the aircraft and when the amount of compressed gas is at the maximum operational temperature, the second total amount of work being at most 1.5 times greater than the first total amount of work.

6. A method in accordance with claim 1, wherein the step of predicting the minimum operational temperature of compressed gas further comprises predicting the minimum operational temperature to be minus forty degrees Fahrenheit and wherein the step of predicting the maximum operational temperature of compressed gas further comprises predicting the maximum operational temperature to be one hundred and sixty-five degrees Fahrenheit.

7. A method in accordance with claim 1 further comprising the step of disconnecting the source of compressed gas from the aircraft, the disconnection occurring prior to flight of the aircraft and the source of compressed gas remaining disconnected from the aircraft when the aircraft is in flight.

8. A method in accordance with claim 7 further comprising maintaining the amount of compressed air at approximately the pressure-to-temperature ratio during a period extending from the step of disconnecting of the source of compressed gas to the step of using the amount of compressed gas to actuate the store rack, the maintaining occurring without adding energy to the compressed gas during flight from any power source other than from ambient conditions surrounding the aircraft.

9. A method comprising:
providing an aircraft having at least one pneumatically actuated store rack and a gas storage system, the gas storage system being configured to contain compressed gas;
attaching a store to the store rack;
determining an initial pressure for supplying the gas storage system with compressed gas, the determination being dependent upon a temperature measurement;
supplying compressed gas to the gas storage system via a source of compressed gas in a manner such that an amount of compressed gas within the gas storage system has a pressure approximately equal to the determined initial pressure;
using the portion of the amount of compressed gas to actuate the store rack and thereby jettison the store from the aircraft.

10. A method in accordance with claim 9 further comprising the step of calculating a pressure-to-temperature ratio, the step of determining the initial pressure for supplying the gas storage system with compressed gas further comprising using the pressure-to-temperature ratio to determine the initial pressure from the temperature measurement.

11. A method in accordance with claim 10, wherein the method further comprises the steps of predicting a minimum operational temperature of compressed gas within the gas storage system that is likely to occur during flight of the aircraft and predicting a maximum operational temperature of compressed gas within the gas storage system that is likely to occur during flight of the aircraft, the step of calculating the pressure-to-temperature ratio further comprising calculating the pressure-to-temperature ratio such that the amount of compressed gas would have a pressure capable of actuating the store rack in a manner to impart at least a first total amount of work to the store when the store is released from the aircraft and when the amount of compressed gas is at the minimum operational temperature, and such that the amount of compressed gas would have a pressure low enough to actuate the store rack in a manner to impart at most a second total amount of work to the store when the store is released from the aircraft and when the amount of compressed gas is at the maximum operational temperature, the second total amount of work being at most 1.5 times greater than the first total amount of work.

12. A method in accordance with claim 9, wherein the step of determining the initial pressure for supplying the gas storage system with compressed gas further comprises the determination being dependent upon a temperature measurement of ambient air surrounding the aircraft.

13. A method in accordance with claim 9, wherein the step of determining the initial pressure for supplying the gas storage system with compressed gas further comprises using a chart of temperature values and correlating pressure values and identifying the initial pressure via the chart and the temperature measurement.

14. A method in accordance with claim 9 further comprising the step of disconnecting the source of compressed gas from the aircraft, the disconnection occurring prior to flight of the aircraft and the source of compressed gas remaining disconnected from the aircraft when the aircraft is in flight.

15. A method in accordance with claim 14 further comprising maintaining the amount of compressed air at approximately the pressure-to-temperature ratio during a period extending from the step of disconnecting of the source of compressed gas to the step of using the amount of compressed gas to actuate the store rack, the maintaining occurring without adding energy to the compressed gas during flight from any power source other than from ambient conditions surrounding the aircraft.

16. A method comprising:
providing an aircraft having at least one pneumatically actuated store rack and a gas storage system;
attaching a store to the store rack;
calculating a pressure-to-temperature ratio;
supplying compressed gas to the gas storage system via a source of compressed gas in a manner such that an amount of compressed gas within the gas storage system has a pressure-to-temperature ratio approximately equal to the calculated pressure-to-temperature ratio, the calculated pressure-to-temperature ratio being such that the amount of compressed gas would have a pressure capable of actuating the store rack in a manner to impart at least a first total amount of work to the store when the store is released from the aircraft and when the amount of compressed gas is at a temperature of minus forty degrees Fahrenheit, the calculated pressure-to-temperature ratio also being such that the amount of compressed gas would have a pressure low enough to actuate the store rack in a manner to impart at most a second total amount of work to the store when the store is released from the aircraft and when the amount of compressed gas is at a temperature of one hundred sixty-five degrees Fahrenheit, the second total amount of work being at most 1.5 times greater than the first total amount of work;
using the amount of compressed gas to actuate the store rack and thereby jettison the store from the aircraft.

17. A method in accordance with claim 16, the method further comprising the step of making a temperature measurement, the step of supplying compressed gas to the gas storage system further comprising determining an initial pressure that together with the measured temperature yields the calculated pressure-to-temperature ratio.

18. A method in accordance with claim 17, wherein the step of supplying compressed gas to the gas storage system further comprises determining the initial pressure using a chart of temperature values and correlating pressure values.

19. A method in accordance with claim 17, wherein the step of making the temperature measurement further comprises making a temperature measurement of ambient air surrounding the aircraft.

20. A method in accordance with claim 16 further comprising the step of disconnecting the source of compressed gas from the aircraft, the disconnection occurring prior to flight of the aircraft and the source of compressed gas remaining disconnected from the aircraft when the aircraft is in flight.

21. A method in accordance with claim 20, further comprising maintaining the amount of compressed air at approximately the pressure-to-temperature ratio during a period extending from the step of disconnecting of the source of compressed gas to the step of using the amount of compressed gas to actuate the store rack, the maintaining occurring without adding energy to the compressed gas during flight from any power source other than from ambient conditions surrounding the aircraft.

* * * * *